(12) United States Patent
Rieche et al.

(10) Patent No.: US 6,580,469 B1
(45) Date of Patent: Jun. 17, 2003

(54) PROJECTION DEVICE

(75) Inventors: Gerd Rieche, Jena (DE); Dietrich Schmidt, Jena (DE); Juergen Pudenz, Jena (DE); Hans-Juergen Meissner, Jena (DE); Hans-Joachim Stoehr, Jena (DE); Eberhard Piehler, Nerkewitz (DE); Rainer Schnell, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/446,881

(22) PCT Filed: Mar. 19, 1999

(86) PCT No.: PCT/EP99/01061
§ 371 (c)(1),
(2), (4) Date: Dec. 28, 1999

(87) PCT Pub. No.: WO99/56166
PCT Pub. Date: Nov. 4, 1999

(30) Foreign Application Priority Data

Apr. 28, 1997 (DE) .......................... 298 07 683
Apr. 29, 1998 (DE) .......................... 198 19 245
Apr. 29, 1998 (DE) .......................... 198 19 246

(51) Int. Cl.⁷ .................................. H04N 5/64
(52) U.S. Cl. .................... 348/744; 348/781; 359/37; 359/98
(58) Field of Search ................ 348/742–747, 348/751, 758, 759, 766, 777, 781, 786; 359/431, 831–832; 353/33, 37, 81, 98, 99; H04N 5/64

(56) References Cited

U.S. PATENT DOCUMENTS

| | | | | |
|---|---|---|---|---|
| 4,371,242 A | * | 2/1983 | Dietrich et al. | 353/101 |
| 5,467,146 A | * | 11/1995 | Huang et al. | 348/43 |
| 5,592,188 A | * | 1/1997 | Doherty et al. | 345/84 |
| 5,704,701 A | | 1/1998 | Kavanagh et al. | |
| 5,760,976 A | * | 6/1998 | DeLaMatyr et al. | 359/288 |
| 5,884,991 A | * | 3/1999 | Levis et al. | 349/9 |
| 5,905,545 A | * | 5/1999 | Poradish et al. | 348/743 |
| 5,917,558 A | * | 6/1999 | Stanton | 348/742 |
| 5,978,051 A | * | 11/1999 | Gohman et al. | 348/766 |
| 5,993,007 A | * | 11/1999 | Jung | 353/20 |
| 6,024,453 A | * | 2/2000 | Edlinger et al. | 348/743 |
| 6,094,294 A | * | 7/2000 | Yokoyama et al. | 353/30 |
| 6,144,420 A | * | 11/2000 | Jung | 349/5 |
| 6,246,446 B1 | * | 6/2001 | Heimbuch et al. | 348/744 |
| 6,252,636 B1 | * | 6/2001 | Bartlett | 348/743 |
| 6,262,781 B1 | * | 7/2001 | Deter | 348/744 |
| 6,278,540 B1 | * | 8/2001 | Wang | 359/245 |
| 6,329,963 B1 | * | 12/2001 | Chiabrera et al. | 345/589 |

FOREIGN PATENT DOCUMENTS

| | | |
|---|---|---|
| DE | 36 24 687 A1 | 5/1987 |
| EP | 0 589 179 | 3/1994 |
| EP | 0 710 036 | 5/1996 |
| EP | 734 183 A2 | 9/1996 |
| FR | 1 121 971 | 8/1956 |

OTHER PUBLICATIONS

* English Abstract of DE 36 24 687 A1.
Fernseh–undKino–Technik 50.Jg., Nr. Oct. 1996, pp. 555–564.
Electronik Feb. 1996, pp. 56–70.

* cited by examiner

*Primary Examiner*—John Miller
*Assistant Examiner*—Brian Yenke
(74) *Attorney, Agent, or Firm*—Reed Smith LLP (57) ABSTRACT

In a projection device with a matrix (50) located in an image plane for generating a video image, with optics (9) for projection of this video image on a screen and with a light source (3, 30) for illuminating the matrix (50), there is an arrangement by which the video image can be uniformly illuminated.

23 Claims, 7 Drawing Sheets

PROJECTION DEVICE

BACKGROUND OF THE INVENTION a) Field of the Invention

The invention is directed to a projection device with a matrix located in an image plane for generating a video image, with optics for projection of this video image on a screen and with light source for illuminating the matrix.

b) Desecration of the Related Art

A technique of the type mentioned above is known from video projection devices, already commercially available at the present time, in which an LCD matrix is installed between a light source and optics like a transparency in a slide projector and is imaged by the optics on a screen.

The LCD matrix is controlled, for example, for displaying video images. In this way, a video picture can be imaged on a screen as a large image by means of the technique known from slide projection. This large-image technique is considered to be trend-setting because electronic picture tubes can not be used for very large images.

Aside from the above-mentioned transmitted light projection known for transparencies, incident light projection with an LCD such as is known from episcopes would also be suitable for the above purpose, wherein the LCD lies in the image plane of the episcope construction in this case.

When use of the incident light projection method is desirable, a mirror array or matrix can also be used instead of the LCD matrix. A matrix of this kind can be obtained as a circuit from Texas. Instruments, for example. In this case, a plurality of tilting mirrors, one for each picture point, arranged in a matrix are digitally controlled. In one digital state, a tilting mirror reflects the full light intensity; in the other state, the mirror receives and reflects the light at an angle at which it can no longer be thrown onto the screen. This means that the corresponding picture point is dark on the screen except for small proportions of scattered light.

The different degrees of brightness of the light for displaying the gray value or color value of a picture point are adjusted in that the mirrors are acted upon by a suitable pulse train so that only an intermediate value between full light intensity and dark is perceived by the eye of an observer for every picture point in time average.

The known episcope method and slide projection methods are disadvantageous in that a very high light output is required of the light source, whose heat output could, for example, destroy the LCD. For this reason, elaborate cooling is also required in projectors of this type which makes these devices heavy, inconvenient and expensive.

In addition, conventional episcope technique is not suitable for the tilting mirror technique because with the latter technique the best image is achieved when the light reaches the matrix only at a defined angle, i.e., precisely the adjustment angle of the tilting mirrors for the darkness value such that only a small surface of practically zero is opposed to the light source from the mirror for reflection. However, in the case of a concave-mirror structure such as is known from episcopes for illumination of an image, the defined angle cannot be adjusted. Therefore, as regards illumination which is advisably carried out at a defined angle in the case of tilting mirrors, a substantially greater light loss must be taken into account compared with the known episcope technique.

OBJECT AND SUMMARY OF THE INVENTION

It is the primary object of the invention to reduce light loss in such projectors as far as possible and accordingly to provide a compact video device of the type mentioned above in which the problem of cooling is minimized in spite of a compact construction.

This object is met by providing an arrangement by which the video image is uniformly illuminated and, in particular, in that a device for mixing the light of the light source by means of multiple reflections is provided between the light source and the matrix, and the mixed light is directed to the matrix proceeding from the device.

The device, according to the invention, for mixing the light of the light source is used for generating the most uniform possible light density or luminance on the matrix. In conventional lamps there is always nonuniform luminance because of the filament or the volume always required for emission of light, so that a certain nonuniformity must always be taken into account in illumination. For this reason, the generated light spot on the transparency, on the image to be projected, or on the LCD matrix should always be expanded farther than the dimensions of the latter so as to enable a light field which is as homogeneous as possible. However, the light loss resulting from this is reduced according to the invention in that the light is repeatedly reflected back and forth in the device for mixing before it exits this device again, so that the origination of every light bundle in the emission volume of the light source is lost. The light field generated in this way then has a very uniform luminance after exiting the device for mixing. This device for mixing can be, e.g., a light-conducting fiber or a mirror system for reflecting back and forth.

The resulting advantage for mixing, particularly with respect to required output, can easily be illustrated by a numerical example. While conventional technique only assumes that an area twice as large as that necessary for the area of the image must be illuminated, the edge length can be reduced by up to one half in the uniform illumination according to the invention. This means that only a fourth of the output is required as a result of the device for mixing.

The extreme benefit gained by the device for mixing according to the invention derives above all in the improved adaptation of the size of the light spot to the area of the image. The drastic reduction in output achieved in this way follows from the quadratic dependence of the size of the light spot on the edge length to be illuminated.

However, it has also turned out unexpectedly that the video images generated by means of the device for mixing are of a substantially higher quality than is the case without the device. This results primarily from the fact that the more uniform illumination of the matrix carried out by means of the invention also permits a better reproduction of the image contents.

In a preferred further development of the invention, the matrix is formed of digitally controllable tilting mirrors. In comparison with the LCD matrixes mentioned above, the benefits of the device for mixing come into play in a particularly advantageous manner precisely in these matrixes by which a defined angle can also be adjusted because the light impinges essentially only from the direction of the device for mixing.

As was already stated, it is advisable in mirror matrixes that a defined angle can be maintained in a particularly simple manner by means of a corresponding geometric construction of the projection device and a suitable geometric arrangement of the device for mixing with respect to the matrix.

The light loss can then be further reduced, according to an advantageous further development of the invention, when coupling-in optics are provided between the light source and the device for mixing. The coupling-in optics ensure that the greatest possible amount of light reaches the device for mixing from the light source. Therefore, it also prevents an avoidable light loss.

In the same way, another further development of the invention advantageously results in a reduction in the required amount of light in that coupling-out optics are provided between the device for mixing and the matrix, wherein the matrix can be illuminated by the coupling-out optics. In particular, the angle for the illumination of the matrix with the digitally controllable tilting mirrors can be adjusted with the coupling-out optics by means of a corresponding geometric configuration in such a way that the highest possible contrast for high-quality images can be achieved.

It is further provided according to a preferred further development of the invention that a field lens is arranged in front of the matrix. By means of the field lens, it is possible, for example, to achieve a magnification effect by means of which the light exiting from the device for mixing can be adjusted particularly well to the image field to be illuminated, since the accuracy of adjustment is increased as a result of the magnification effect of the field lens. This makes it easier to bring the light spot into coincidence with the image field. Due to the resulting simplification, it is advantageous, above all for series production, that the light field for illuminating the matrix can be provided with especially small dimensions Accordingly, this feature also has a positive effect with respect to economizing on output.

Scattering mirror surfaces followed by focusing optics could be used as the device for mixing. Light-conducting fibers could also be used for this purpose, but would have to be rigidly fastened so that the image field can shift if their position changes. However, it has also proven advantageous in a further development of the invention when the device for mixing has a body in the form of a geometric prism, wherein the light from the light source is introduced into the base surface of the prism and the mixed light for illuminating the matrix is taken from the upper surface of the prism. In this way, an effective mixing is generated during the transport of light over the length of the geometric prism, while the light is reflected back and forth at its side surfaces. In particular, this further development of the invention also has the advantage that bodies of the above-mentioned type can be manufactured in a simple manner so that arrangements according to the invention intended for the consumer market are especially economical.

In an advantageous further development of the invention, the geometric prism has a rectangular base surface whose aspect ratio is determined by the aspect ratio of the video image formed by the matrix.

In this respect, a particularly uniform illumination is achieved in all directions due to the fact that the light emerging from the upper surface allows the two aspect ratios of the upper surface of the prism shape to be adapted to those of the video image. However, it must be taken into account with respect to the adaptation of the two aspect ratios that the aspect ratio could be changed by mirrors, diaphragms, lenses, etc. in the light path behind the device for mixing the light emerging therefrom. In this connection, the aspect ratios are determined in such a way that the light exiting from the body uniformly illuminates the matrix in both surface dimensions A body of this kind could be constructed, for example, as a tube with inner reflective coating. In this way, practically all of the light entering the device for mixing at its input can be transmitted to the output. However, it has proven substantially more advantageous when the outer surface of the body used for mixing is not given a reflective coating and mixing is carried out by means of multiple reflections based on total reflection at this outer surface. In this way, the reflective coating can be dispensed with, which is extremely advantageous in the interests of an inexpensive video device especially for the consumer market.

In a preferred further development of the invention, the ratio of the length of the prism axis to the lateral extension is greater than $$5/\sqrt{n^2-1},$$

where n represents the calculation or optical design index of the material. This equation makes use of the insight that a mixing which is sufficient for video projection is carried out when the light is reflected back and forth at least five times. Within the indicated limit, the smallest length for the prism-shaped body can be determined in order to achieve an effective device for mixing while maintaining small dimensions at the same time. That is, the dimensions should not be too large so that the projection device remains compact. It is therefore advisable with respect to the dimensioning of the prism length of the mixing device not to exceed 100 to 200 reflections. Further, the polygonal body is advantageously made of glass.

It is precisely in the case of total reflection, however, that light losses can occur as a result of incorrect holding of the prism, wherein these light losses can lead to partial disruption of the total-reflection behavior due to bending or contact between the holder and the polygonal body. In order that light loss of this kind can also be minimized as far as possible, it is provided in accordance with a further development of the invention that a holder for the body is made from sheet metal with a thickness of less than 1 mm, in particular, less than 0 5 mm, wherein the holder contacts the body exclusively by an edge having this dimension. Because of the small contact surface of the holder with respect to the polygonal body which is made possible in this way, light losses are negligible at the given dimensions.

Further, an appropriate holder is characterized according to an advantageous further development of the invention in that a holder for the body is made from springing sheet metal whose spring tension acts vertical to the prism axis and draws the body vertical to the prism axis against an edge of the housing as an abutment and in that a groove is provided in an outer surface of the body, wherein a spring which is attached to the housing engages in this groove.

It is also possible by means of matrixes of the kind mentioned above to display a color image display. One possibility consists in providing a color wheel with different color filters between the light source and the matrix, which color wheel sequentially filters different colors of the light due to its rotation, wherein the information is adjusted on the matrix synchronously with the color of the light impinging on the matrix at that instant. In a preferred further development of the invention, this color wheel is arranged between the light source and the device for mixing. This position is particularly suitable because scattering in or on the color wheel due, for example, to imperfections in the material or because of surface dust is compensated by the subsequent mixing, so that a high-quality video image is possible even when such defects occur.

According to a preferred further development of the invention, it is provided that an adjusting element is arranged behind the device for mixing so that the light emerging from the device for mixing is oriented on the matrix.

As was already made clear, for prevention of light losses especially with respect to the small surfaces intended to be illuminated with tilting mirror matrixes, it is particularly advantageous when the light emitted from the device for mixing can be adjusted on the matrix. An individual adjusting element whose construction will be made clearer from the embodiment example described in the following is provided for this purpose.

The following remarks pertain primarily to tilting mirror matrixes. Because of the small divergence required for complete absorption when a video image is darkened and the simultaneous desire for high light intensity when brightening so that a large screen can be illuminated, problems arise in a compact construction because, on the one hand, a long light path must be provided and, on the other hand, the output loss should not lead to a heat build-up in the component elements for reasons of economy. Particularly as regards heat management, it must be taken into account that the tilting mirror matrix is a micromechanical semiconductor component which operates in a reproducible manner only within a defined temperature range.

In a preferred further development of the invention, the light source is arranged near the tilting mirror matrix and at an angle such that the light bundle is directed away from this tilting mirror axis, and a folded optical light path is provided for transmitting a light bundle emitted by the light source to the tilting mirror matrix.

By means of the folded optical light path, the appropriate length is adjusted so that the light impinging on the tilting mirror matrix has a suitably small divergence. However, it serves another purpose according to the invention in that the light of the light source which, in accordance with the invention, is not directed onto the tilting mirror matrix directly is deflected for displaying images.

There are two distinct advantages in arranging the light source in the vicinity of the tilting mirror matrix, wherein the light bundle is directed away from the tilting mirror matrix. First, cooling, e.g., by means of a ventilator, can be applied in such a way that the light volume, especially a filament, of the light source, and the tilting mirror matrix can both be cooled by a single element. Second, the cooling leads to very stable reproducible video images since all of the heat loss originates in the vicinity of the tilting mirror matrix, which means that switching the tilting mirrors to other states, for example, for displaying a darker video image, only leads to a slight change in the heating of the tilting mirrors due to the resulting increased absorption, so that the tilting mirror matrix is kept essentially temperature-stabilized through cooling and uniform heating by means of the light source. This means that, in contrast to other arrangements, the reproducibility of the images is substantially independent from the image content. Therefore, a particularly compact video device can be provided.

In order to keep the required amount of light as small as possible so that heat-related problems are further reduced, it is provided in an advantageous further development of the invention that the folded optical light path is brought about by two deflecting mirrors, wherein a light guide extends therebetween. Costs are lowered by limiting essentially to two deflecting mirrors. The provided light guide provides in particular for a high homogeneity of light, so that the tilting mirror matrix can be uniformly illuminated. This leads to a lower light output for the light source because, in principle, only the surface area of the tilting mirror matrix must be illuminated. Further, the light from the light guide is homogenized because of the back-and-forth reflection; that is, a more uniform light spot is provided for illuminating the tilting mirror matrix, which enables an especially high image quality.

In a preferred further development of the invention, the light guide is a rectangular rod made of material which is transparent for the light of the light source and has a cross section adapted to the tilting mirror matrix. In a rectangular rod of this kind the light is conducted by total reflection as is also known from other light guides. While a rod of this kind could also be constructed with mirror coatings, a simple rod can be manufactured in a particularly economical manner, for example, from glass, resulting in a lower price which is particularly advantageous for the consumer market.

The cross section adapted to the tilting mirror was selected for this further development so that virtually all of the light emerging from the rod can be used to illuminate the matrix by imaging the output face of the rod on the tilting mirror matrix As a result of this step, a light source can be used which has a lower output than would be needed if the edges of the tilting mirror matrix had to be illuminated by large areas. This step also drastically reduces problems related to heat.

For the same purpose, according to an advantageous further development of the invention, coupling-in optics are provided between the light source and the rectangular rod for focusing the light bundle on an input face of the light guide. Due to this step, as much of the light from the light source as possible is coupled into the light guide, so that the output requirement of the light source can be lowered due to the resulting reduced light losses, which in turn reduces heat problems.

According to another preferable further development of the invention, a color wheel is provided between the coupling-in optics and the input face of the light guide. A color wheel is known with respect to the described generation of video images with tilting mirror matrixes for displaying color pictures. With this color wheel, different color filters are switched in front of the light source in sequence, so that different colors proceed from the light source. The tilting mirror matrix is controlled synchronously with the respective light color with the different color separations, e.g., red, green, and blue (R, G, B). The impression of a color image originates through superposition of the color separations as a result of the inertia of the human eye.

With respect to this further development of the invention, the arrangement of the color wheel is particularly advantageous. Because of its position between the coupling-in optics and input face of the light guide, it is far away from the parts of the arrangement that are subjected to heat, as will be seen in particular from an embodiment example. In the embodiment example, an air flow for cooling the light source and tilting mirror matrix can also be directed to the color wheel simultaneously. Further, a particular advantage results in this arrangement in that variations in light intensity due to irregularities in the color wheel and dust on its surface are rendered homogeneous by the light guide, which results in a particularly high image quality.

The light bundle can be aligned particularly well for reduction in the output of the light source according to a preferred further development of the invention when a cylindrical adjusting element is provided in the folded optical light path, wherein a deflecting mirror of the folded optical light path is fastened in the adjusting element, wherein the light of the light source can be oriented on the tilting mirror matrix by means of this deflecting mirror. For a particularly good orientation to the tilting mirror matrix, it is further advantageous when all of the light is focused on the tilting mirror matrix. For this purpose, it is provided according to a preferred further development of the invention that an optical system for focusing the light bundle on the tilting mirror matrix is arranged in the adjusting element.

As was already made clear above with respect to the rectangular rod, it is especially advantageous when a rectangular light surface is imaged on the tilting mirror matrix. Possible focusing for this purpose can be carried out, for example, with the optical system which is arranged inside the adjusting element. By changing the location of the adjusting element during adjustment, suitable focusing conditions can always be adjusted.

In this regard, it is also provided in a preferred further development of the invention that a rectangular, light-emitting surface supplied by the light source is formed in front of the adjusting element and the adjusting element has at least a two-lens system by means of which the light-emitting surface can be imaged on the tilting mirror matrix.

The rectangular surface can be constructed by means of the rectangular rod mentioned above. It is also possible for the surface supplied by the light source to be formed in other ways, for example, by means of providing a rectangular diaphragm in the beam path.

According to a preferred further development of the invention, it has turned out to be particularly advantageous for compactness and for good imaging properties at the same time that the linear magnification or imaging scale of the at least two-lens system is between 1 and 5. In the embodiment example indicated hereinafter, a reduction factor of 2 was selected in particular.

A favorable light output combined with a low heat output results from an improved adjusting possibility according to an advantageous further development of the invention in that a field lens is arranged in front of the tilting mirror matrix. The adjustment is facilitated in particular because the field lens also maintains the desired angle on the tilting mirror matrix, that is, essentially the angle for optimum dark/bright ratios. Further, adjustment is facilitated because the field lens enables a large movement of the adjusting element into a small movement of the light bundle on the tilting mirror matrix. This improved adjustment possibility is especially beneficial for a commercial video device because the light path can be adjusted more easily even when the device is constructed in a very compact manner and the light spot generated on the tilting mirror matrix by the light source can be guided in an economical manner virtually completely with only slight, acceptable overlapping of the edge area of the tilting mirror matrix.

According to a further development of the invention, it is provided in particular that the light bundle directed on the tilting mirror matrix along the optical light path is directed through the field lens to the tilting mirror matrix, while the light reflected from the tilting mirror matrix into the objective enters the objective without being influenced by the field lens. This benefits increased compactness because the field lens no longer interferes with the light leaving the tilting mirror matrix. One of the ways that this can be achieved is through a special construction of the field lens in which a hole is drilled in the lens for the light reflected by the matrix.

For a particularly economical construction of the video device, especially also to promote compactness, it is provided according to an advantageous further development of the invention that the field lens has a semicircular cross section vertical to the optical axis, especially a half-circular cross section which is arranged between the incident light bundle and tilting mirror, wherein an opening defined by the divergence from the circular shape lies between the tilting mirror matrix and the objective.

The compactness of a video device of the type mentioned above can also be increased in accordance with a further development of the invention in which a final deflecting mirror is provided in the optical light path, wherein this final deflecting mirror directs the light bundle out of a plane of the optical light path lying in front of this deflecting mirror onto the tilting mirror matrix As a result of this type of arrangement of the optical light path, the light is guided in three dimensions instead of in a plane.

The invention will be further clarified in the following description of embodiment examples with reference to the drawings.

Figure 1:
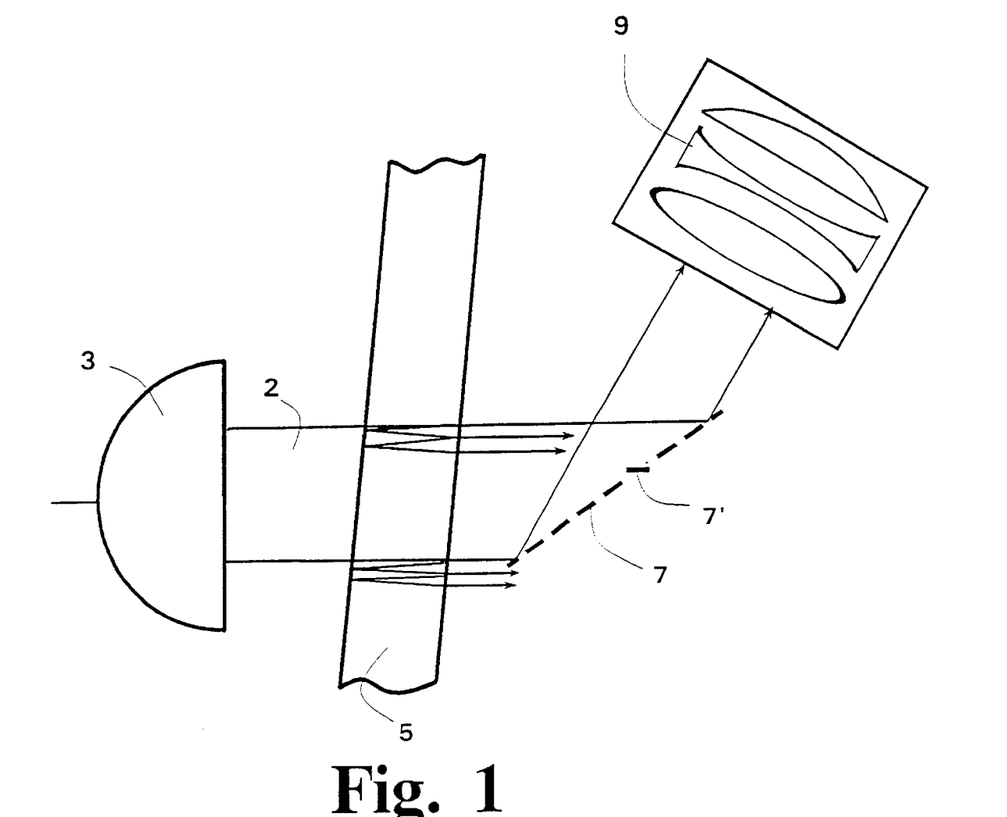
FIG. 1 is a schematic diagram illustrating the mixing principle used in the invention.

FIG. 1 shows the basic principle by means of which a light bundle 2 is rendered homogeneous in order to improve illumination of a matrix used to display a video image. The light bundle proceeds from a lamp such as a halogen lamp, an arc lamp, or the like which is installed in a reflector and exits therefrom as a substantially parallel light bundle. The lamp and reflector form the light source 3.

A light bundle 2 of the kind mentioned above generally has angular divergence. Further, the emission volume which is formed, for example, by a luminous filament emits light in the light source 3 with an inhomogeneous spatial intensity distribution. In order to direct a light bundle of this kind on an LCD matrix or tilting mirror matrix, the above-mentioned inhomogeneity would cause a nonuniform illumination which would detract from the quality of the image presentation on the LCD matrix or tilting mirror matrix. According to the prior art, it is advisable to illuminate a larger area than the matrix chiefly in order to reduce the influence of the drop in the light intensity due to angular divergence and spatially inhomogeneous light distribution toward the edges of the matrix.

A device for mixing 5 provided in the example shown in FIG. 1 causes a homogenization of the light density or luminance in such a way that only the desired area of the matrix can be illuminated with only slight overlapping of the edges. This leads to a higher luminance on the tilting mirror matrix and can save on power for the light source 3 so as to facilitate cooling because a light source 3 of lower than usual intensity can be used.

In the example shown schematically in FIG. 1, the device for mixing 5 is a plane-parallel plate having a reflective coating on both of the sides which are penetrated by the light bundle 2. The light bundle 2 is expanded and homogenized in the plane-parallel plate in that the individual light beams are reflected back and forth as is indicated in FIG. 1 by the arrows. In this way, a virtually homogeneous light bundle is obtained at the output of the device for mixing, so that the matrix need only be illuminated on a field corresponding approximately to the extension of the tilting mirror matrix. Lateral decreases in luminance in the edge areas contribute only slightly to overall illumination and the light loss caused by this is negligible compared to the illumination generated in the prior art without the device for mixing 5.

FIG. 1 also shows the principle of image display with a matrix. A tilting mirror matrix, shown schematically, which is formed of a plurality of mirrors 7 directs the reflected light for the video image adjusted on the tilting mirror matrix into an objective 9 which in turn projects the image on a screen.

All of the tilting mirrors as shown in FIG. 1 are adjusted for maximum reflection with the exception of a mirror 7' which has only an edge opposed to the light image 2. Only a small amount of light, or exclusively scattered light, is directed into the objective 9 by this mirror. Therefore, this mirror 7' is represented on the screen as a dark field. The tilting mirrors described herein are available from Texas Instruments, USA.

In order to provide suitable luminance for every picture point for a video image for which different mirrors 7, 7' of the tilting mirror matrix are allocated to the individual picture points, mirrors 7, 7' of this type, when only controllable digitally like the mirrors that are presently commercially available, are switched back and forth rapidly for maximum reflection or minimum reflection. For this purpose, the tilting mirrors 7, 7' are acted upon by pulse trains whose dark/bright ratio for every picture point is proportional to the brightness desired for this picture point.

In the device for mixing 5 shown in FIG. 1, it is recommended that at least the upper side facing the light source 3 is provided with dielectric mirror layers in such a way that the back-reflection relative to the light source 3 remains as low as possible. Arrangement of the plane-parallel plate in FIG. 1 at the Brewster angle, e.g., when the light is suitably polarized, also serves the same purpose.

While the back-reflection is also not a disadvantage in the embodiment example shown in FIG. 1 since the reflector provided with the light source 3 throws the back-reflected light back onto the device for mixing 5, the expansion of the light bundle 2 caused by the back-reflection is large.

As was shown in the preceding discussion, the device for mixing which is shown schematically in FIG. 1 is very expensive when dielectric layers or polarizers, for example, are necessary, so that mixing devices of this kind should be avoided as far as possible in the commercial market where price is a primary consideration.

Figure 2:
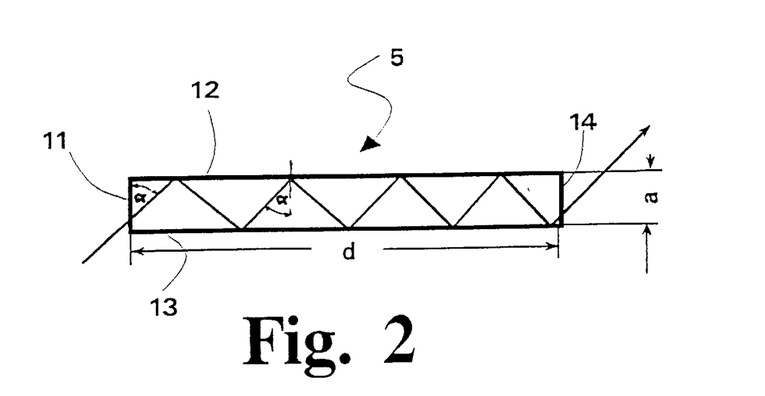
FIG. 2 is a schematic view illustrating the mixing with the use of a polygonal body.

However, in another alternative, shown in FIG. 2, the device for mixing 5 is constructed as a polygonal body. FIG. 2 shows only a section of the polygonal shape.

Incident light proceeding from the base surface 11 of the body is reflected back and forth at the outer surface of the polygon, i.e., the individual polygon sides 12 and 13, due to total reflection. Because of the different incident angles and points of incidence of the individual beams of the light bundle 2 which are always given in the case of expanded light sources when entering the base surface 11, a light bundle 2 with the device for mixing 5 shown in FIG. 2 can be suitably homogenized, wherein the degree of homogenization substantially depends on the selected dimensions.

Two quantities, d for the length of the polygonal body and a for its lateral extension, are shown in FIG. 2. Dimension d should not be too small, so that a sufficient number of reflections can take place. A quantity of at least five reflections has proven advantageous for practical use. The lateral dimension a of the polygonal body used in this case as a device for mixing 5 should likewise be selected so as to be large enough that the tilting mirror matrix 7 is completely illuminated. In this connection, optics were used in the embodiment example which is described in more detail hereinafter, wherein the output surface 14 is imaged on the tilting mirror matrix. Further, the output surface was kept rectangular in order to achieve the best possible illumination of the tilting mirror matrix with respect to the adaptation of the shape.

The following equation is given for total reflection angle α based on the above considerations relating to reflections which are carried out at least five times:

$$\tan(\alpha) = \frac{d}{5a}.$$

However, according to Snell's law of calculation the following equation is given relative to air:

$$\sin\alpha = \frac{1}{n},$$

where n is the optical design index or calculation index of the material of the polygonal body. Based on the known relationships between the angle functions, the following equation is arrived at as an estimate for the lower limit of the ratio of length d to the lateral extension a of the polygonal body:

$$\frac{d}{a} \geq \frac{5}{\sqrt{n^2 - 1}}.$$

Further, in order to avoid light losses through light beams which enter at very flat angles α and are not totally reflected, the side surfaces 12, 13 of the outer surface can be mirror-coated. However, it has been shown that exclusive use of total reflection in the case of a polygonal body is more beneficial for reasons of cost and because the light loss remains within acceptable limits in conformity with the estimated relationship.

Figure 3:
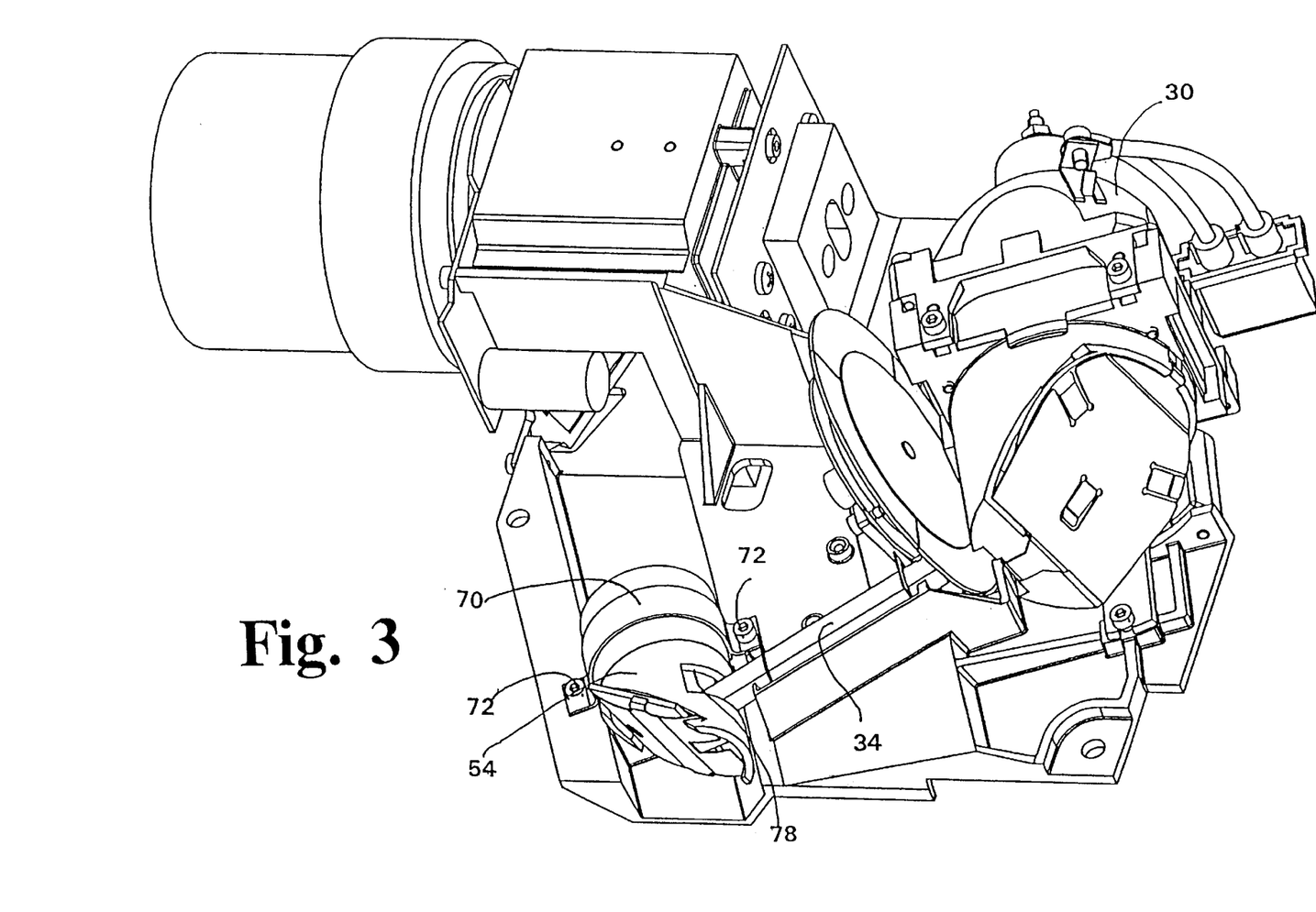
FIG. 3 shows a perspective view of a projection system arranged according to the invention with a tilting mirror matrix.
Figure 4:
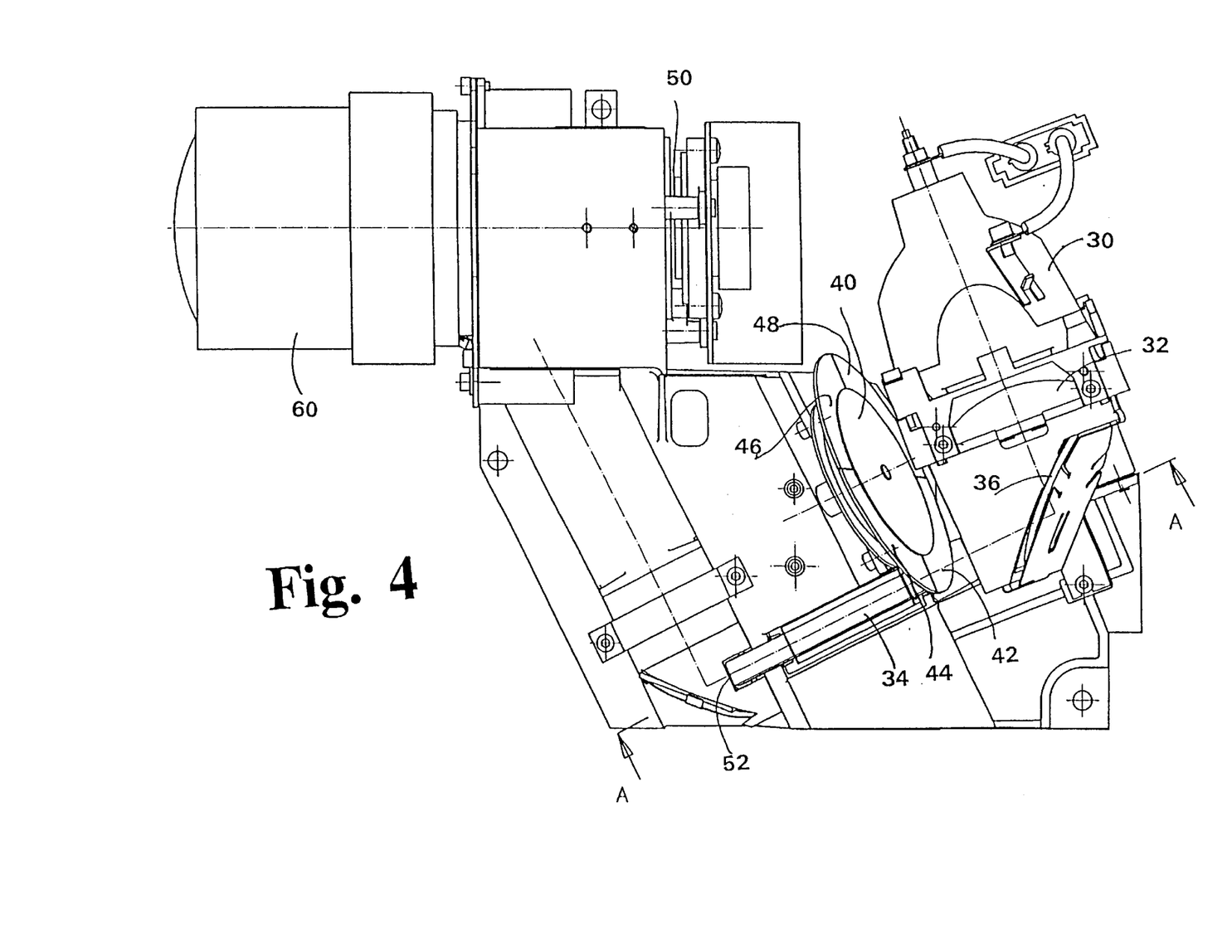
FIG. 4 shows another perspective view of the projection system from FIG. 3.

This principle of homogenization was realized in a practical embodiment example which is explained more fully in the following with reference to FIG. 3 to FIG. 7. FIG. 3 and FIG. 4 show different perspective views of the embodiment example from which its different features can be seen.

In this case, a 120 W lamp 30 which was already provided by the manufacturer for parallelizing light with a reflector is used as light source 3. Its light is focused on the entrance surface of a polygonal body 34 by means of an optical system 32. In order to achieve increased compactness of the device described in the example, a deflecting mirror 36 is provided between the optical system 32 and the rectangular body 34. Further, a color wheel 40 is arranged between the lamp 30 and the polygonal body 34. This color wheel 40 has different segments 42, 44, 46 and 48 which are provided with dielectric filter layers for the colors red, green, blue and white and by means of which the light bundle exiting from the lamp 30 is color-filtered. The color wheel 40 rotates faster than 10 revolutions per second, so that light bundles of all of the colors given by the color filters on the color wheel are directed on the tilting mirror matrix within a time period determined by the inertia of the human eye. The information on the tilting mirror matrix 15 is simultaneously controlled corresponding to the color filter effective at that instant with the corresponding color separation, so that a colored image is detected by the eye of the observer of the video image.

Due to the focusing coupling-in optics 32, the light spot on the color wheel 40 is expanded minimally, so that the tilting mirror matrix 50 need only be darkened briefly to eliminate erroneous information resulting from mixing of colors when passing segment boundaries between the segments 42, 44, 46 or 48 at the focus of the light bundle. These periods are substantially longer in known devices, so that light loss is reduced due to this optical system 32 and the special arrangement of the color wheel 40 in the focus and in front of the polygonal body.

The polygonal body 34 serves as a device for light mixing in order to compensate as far as possible for inhomogeneities of the light emerging from the lamp 30 by means of reflections. For this purpose, total reflection is carried out repeatedly at the outer surface of the polygonal body 34, so that a uniform rectangular field is formed at the output 52 of the polygonal body 34 because of its rectangular cross section. The light exiting from the surface 52 is deflected by a mirror into an optical system constructed as an adjusting element 54 and is subsequently thrown onto the tilting mirror matrix 50. Further details in this regard are described with reference to the following FIGS. 6 and 7. However, it is noteworthy with respect to this arrangement that the color wheel 40 is arranged in front of, and not behind, the polygonal body 34 which is provided as a device for mixing and homogenization. In this way, inhomogeneities in the color wheel 40 and also any dust which may be present on the latter are averaged out by mixing with the polygonal body 34.

The tilting mirror matrix 50 in the embodiment example is formed of 845×600 tilting mirrors with dimensions of 17 $\mu$mm×17 $\mu$mm. The polygonal body 34 has a suitably large length of 75 mm with an entrance surface of 4.8 mm×7 mm which is sufficient for the light in the selected material, namely, glass in the embodiment example, to undergo more than five reflections of the individual beams of the light bundle 2 when passing from the entrance surface to the output face of the polygonal body 34 by means of total reflection. This dimensioning has proven to be extremely favorable for complete mixing.

Figure 5:
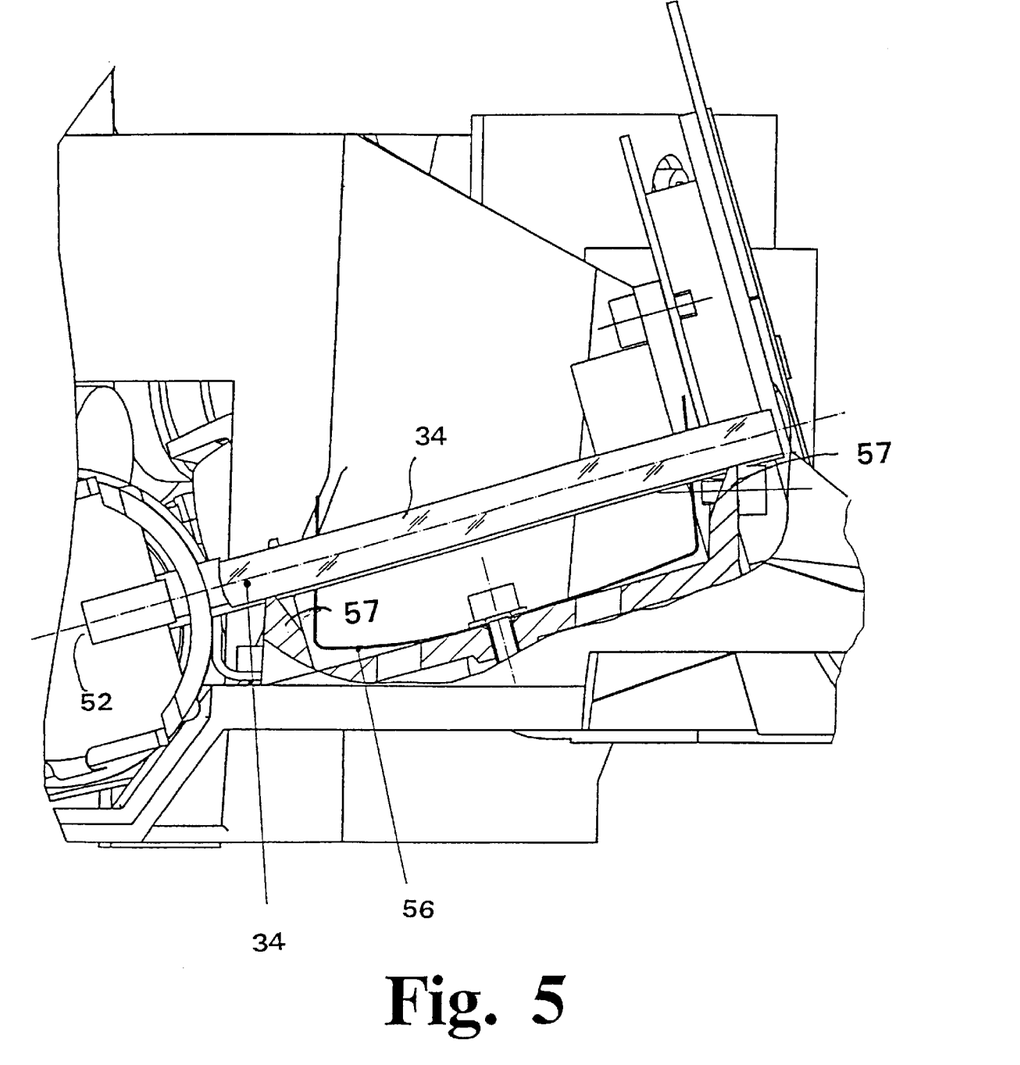
FIG. 5 shows a section through the projection system according to FIG. 3 and FIG. 4 according to line A—A shown in FIG. 4.

In the section shown in FIG. 5, the polygonal body 34 can be seen even more clearly. In the embodiment example, this polygonal body 34 has a rectangular cross section so that the light exiting from its output face 52 is imaged on the likewise rectangular tilting mirror matrix via the optical elements which will be described more fully hereinafter. Further, the polygonal body 34 is made of glass so that it can be produced by standard methods with respect to uniformity for low light loss because the uniformity of the polygonal body 34 is extremely advantageous for maintaining total reflection conditions.

In order to reduce tension on the polygonal body 34 and cancellation of total reflection conditions through contact of the outer surfaces with a holder, which could lead to light loss, a holder 56 is provided which is bent from a simple sheet metal having a thickness of less than 0.5 mm. This holder 56 holds the polygonal body 34 by clamping. Due to the small contact surface, which is practically linear with a maximum extension of 0.5 mm vertical to the line direction of the clamping, light loss which could occur through cancellation of total reflection conditions is limited. The smaller the contact surface, the greater the improvement in the prevention of unwanted total reflection losses.

Further, the holder 56 is constructed in a springing manner and draws the polygonal body down against edges 57 constructed as cutting edges as can be seen in FIG. 5. These cutting edges likewise have only a small surface as a support, which likewise reduces light losses. A groove, not shown, is provided in the body 39 to prevent axial displacement of the body 39, wherein a spring, not visible in the drawing, which is arranged at a part that can be adjusted by screws engages in this groove.

Figure 6:
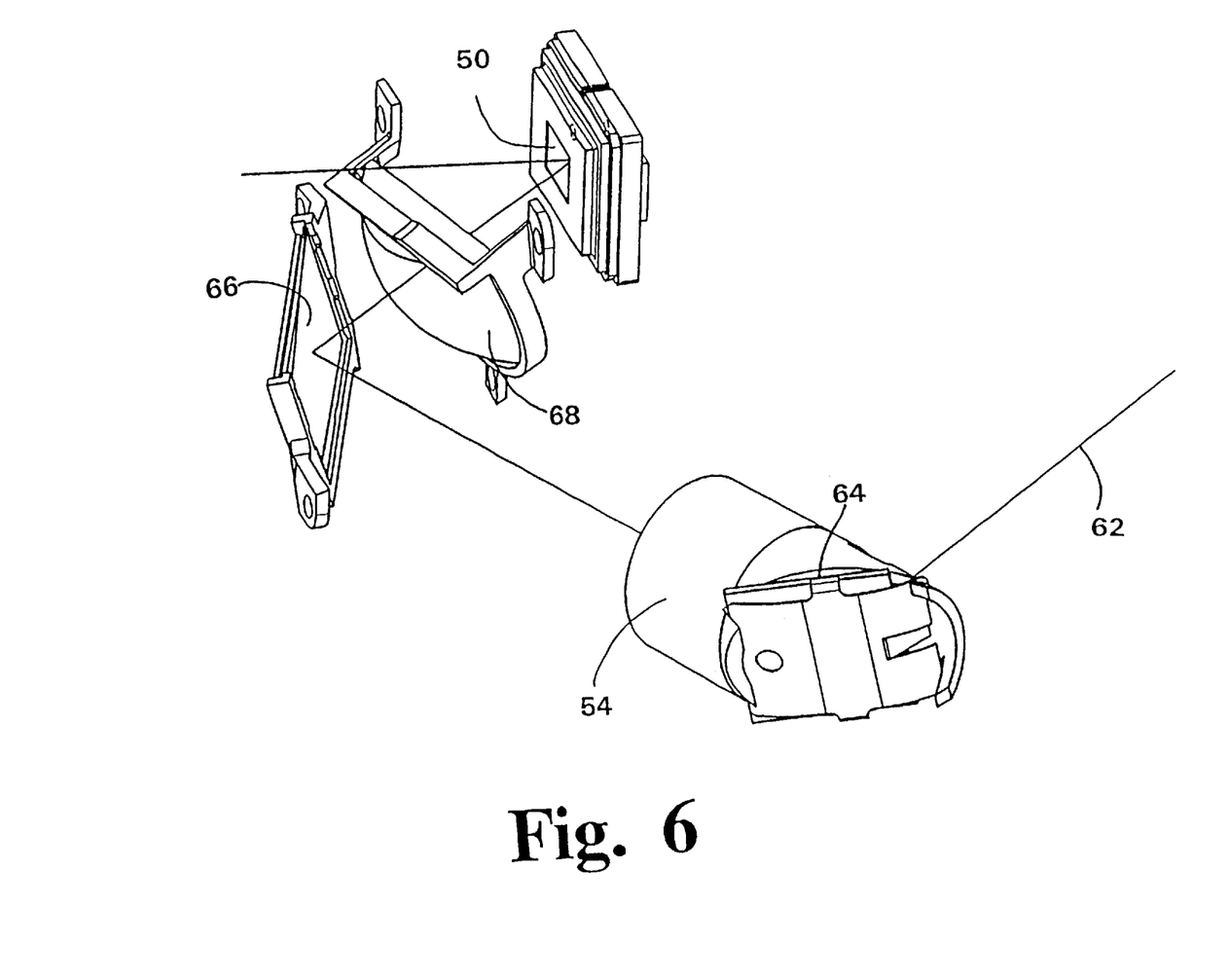
FIG. 6 shows a beam guidance with an adjusting element and the tilting mirror matrix in the embodiment example from FIG. 3 to FIG. 5.

The continued progress of the beam behind the polygonal body to the tilting mirror matrix 50, from which the video image is projected onto a screen via an objective 60, is shown in particular by FIG. 6. A light bundle 62 emerging from the polygonal body 34 is directed to the tilting mirror matrix 50 via the adjusting element 54 containing a mirror 64 to another mirror 66 which guides the light bundle 62 out of the plane in which the light bundle 62 is guided.

The light bundle reflected by the tilting mirror matrix 50 is subsequently guided into the objective 60 which projects the image electrically adjusted on the tilting mirror matrix onto a screen. In order to improve the adjustment by the adjusting element 54, a field lens 68 is provided to reduce its movements in order to maintain the defined angle for the lowest intensity in the dark state on the tilting mirror matrix on the one hand and to make the adjustment more sensitive on the other hand.

The field lens 68 is constructed so as to be semicircular, so that the light emerging from the tilting mirror matrix 50 remains unaffected by the field lens 68 while nevertheless enabling a very compact device. A half-circular field lens 68 was used in the embodiment example. However, it is also possible to drill or in some other manner make a suitably large opening in a conventional circular field lens 68 for the light reflected by the tilting mirror matrix.

The mirror 66 and the field lens 68 are so arranged in geometric relationship to the tilting mirror matrix 60 and adjusting element 54 that imaging conditions are always virtually optimum after adjusting with the adjusting element 54.

In order to provide a compact video device, it has proven particularly advantageous to provide a reduction in the range of 5 to 1 of the rectangular cross section of the output face of the polygonal body by means of the field lens 68 and possibly other optical elements. For this reason, a reduction was carried out in the embodiment example by a factor of 2.

As can be seen in particular from FIG. 3, the adjusting element 54 is fixed by a strap or clamp 70 which is fastened to a base plate by screws 72. The adjustment is carried out with the screws 72 loosened. Due to its cylindrical shape, the adjusting element 54 allows both a rotation and a displacement toward and away from the tilting mirror matrix 50. Both movements are sufficient for directing the light bundle guided from the lamp 30 via subsequent optical elements completely onto the tilting mirror matrix 50. In particular, due to its cylindrical shape and its adapted support in the base plate of the device, the rotating movement of the adjusting element 54 is suited to bring the rectangular light bundle 62 emerging from the polygonal body 34 into coincidence with the rectangular surface of the tilting mirror matrix. The possible displacement in the direction of the light beam path also enables better focusing of the light bundle on the tilting mirror matrix 50 because an optical system 76 provided in the adjusting element 54 is adjusted to the optical axis simultaneous with the displacement movement, so that focusing is made possible. As can be seen particularly from FIG. 3, the adjusting element 54 is held in a trough-shaped cavity and contacts other walls basically only by two straight lines. This type of support, especially when the walls of the cavity are inclined, allows a simple and reproducible rotation as well as a displacement of the adjusting element 54.

Figure 7:
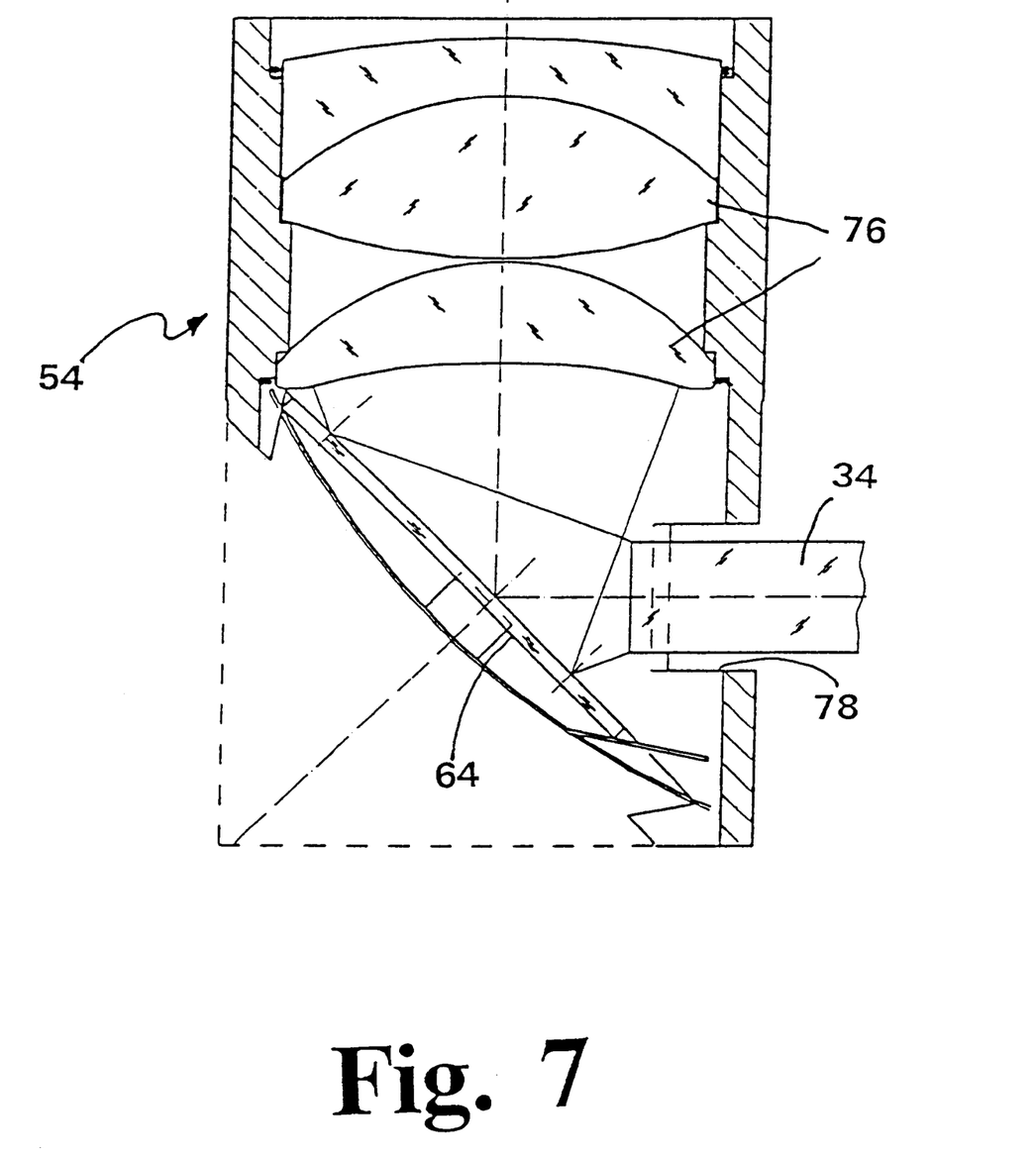
FIG. 7 shows a sectional view of the adjusting element shown in FIG. 6.

The adjusting element 54 is shown in more detail in the sectional view in FIG. 7. The polygonal body 34 is guided into the adjusting element 54 in particular. For this purpose, a cutout 78 is provided in the adjusting element 54. In this case, the light is guided and focused via a three-lens optical system 76. The optical axis coincides with the cylinder axis of the adjusting element 54, which particularly facilitates adjustment because the focusing by means of displacement and the alignment by means of rotation are uncoupled from one another in this way.

The output face of the polygonal body 34 is imaged on the tilting mirror matrix in a scale of 1:2 by means of the optical system 76 and field lens 68. Other reduction factors are also possible. However, an effort is made to keep this factor between 1 and 5 so as to make optimum adjusting characteristics possible while maintaining a compact construction.

As was already shown from the example in FIGS. 3 and 4, the device has a folded beam path which has several peculiarities compared with known beam paths. Reference is had once more to FIG. 1 in this connection.

FIG. 1 shows a light source 3 from which a virtually parallel light bundle 2 is emitted. For this purpose, the light source 3 is outfitted with a filament, a gas discharge or arc lamp, whose light is parallelized by the reflector indicated schematically in FIG. 1. This light impinges on a tilting mirror matrix which is formed of a plurality of tilting mirrors arranged in rows and columns. As was already described, the tilting mirrors are acted upon by the information of a video image. The untilted tilting mirrors 7 fully reflect the incident light into the objective 8 which then images the tilting mirror matrix on a screen. Further, a tilting mirror 7' which is opposed to the light bundle 2 at its adjusted angle is indicated schematically in FIG. 1. This means that only a little scattered light can enter the objective 8 from this tilting mirror.

Since light sources 1 of the type mentioned above are usually expanded light sources which have a high beam product even when the light bundle 2 is approximately parallel, the light bundle 2 contains different rays of light at various angles, so that the required dark/bright ratio can only be achieved when the light source 1 is arranged at a certain distance from the tilting mirror matrix 3. This is contrary, e.g., to the requirement for a particularly compact video device. In order to provide a compact device, it is known in optics to use a folded light path, that is, to guide the beam path in a plane or in space by a plurality of deflecting mirrors. A great many different possibilities exist for this purpose.

Figure 8:
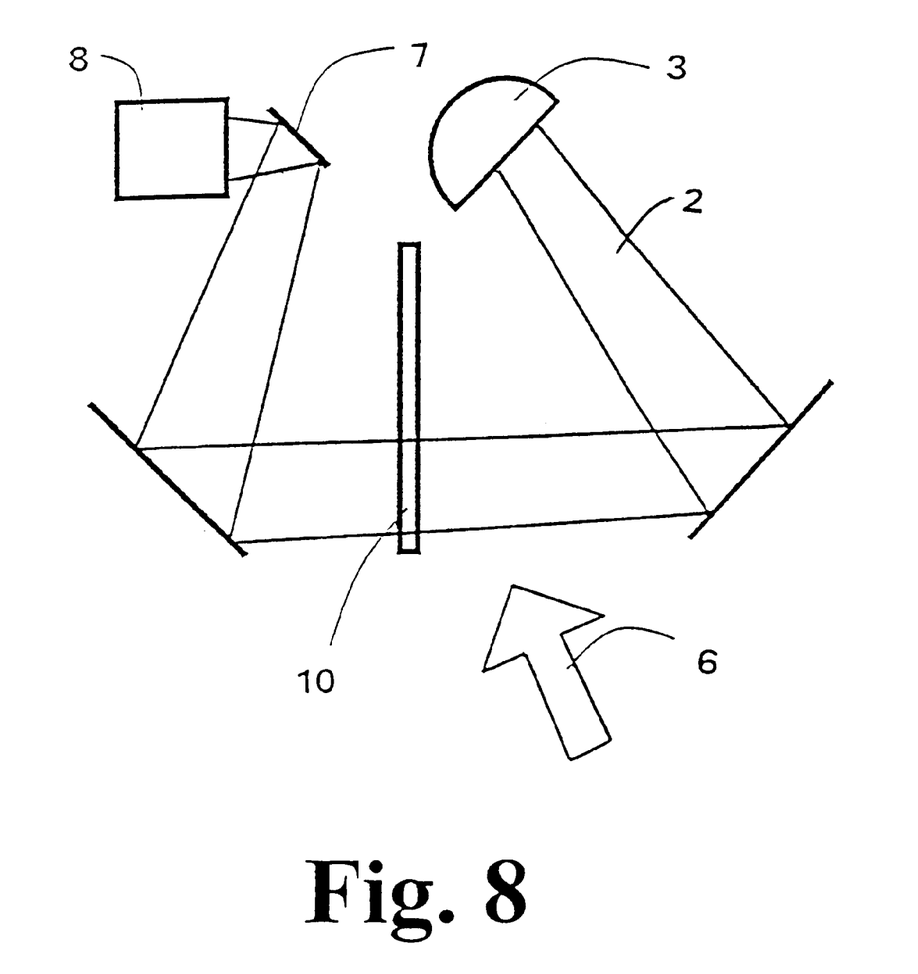
FIG. 8 shows an arrangement similar to that shown in FIG. 1, but with a folded light path and additional color wheel.

However, the folded light path shown in FIG. 8 is provided in an unexpected manner compared with other possibilities for folding a light path in that the light source is arranged in the vicinity of the tilting mirror matrix and the light bundle 2 emanating from the light source is directed away from the tilting mirror matrix. It would be expected that the power loss generated by the light source 3 at the high light outputs for displaying video images with an approximate screen diagonal of 2 m or more would heat the tilting mirror matrix to the extent that it would no longer function properly. However, a significant advantage is gained in that an individual cooling flow 6 can be used, that is, for example, only a single ventilator, which cools both the tilting mirror matrix and the light source 3. When the light path is folded differently, two ventilators might possibly be required for cooling due to the large distance required between the tilting mirror matrix and the light source 3. Therefore, according to FIG. 2, the advantage of an arrangement results primarily in increased compactness. A further advantage results from the fact that a constant temperature is adjusted by means of the uniform heat dissipation of the lamp 3 and the cooling flow 6 at the tilting mirror matrix, which has extremely beneficial results for displaying reproducible images. In other cases, the tilting mirror matrix, whose power loss depends on image content due to the different number of untilted tilting mirrors 7', delivers an inferior image quality.

At lower light outputs of the lamp 3, a ventilator for generating the cooling flow 6 can even be omitted. In this case, the cooling flow is formed entirely by convection when the lamp 1 and tilting mirror matrix are located at the top of the video device, because the generated heat rises and accordingly generates a suction for the cooler air from below.

In order to illustrate more clearly the result of the construction shown in FIG. 8, particularly also with respect to cooling, a color wheel 10 is shown in this Figure. Color wheels of this kind are also used for displaying color images.

The above-described embodiment example of a projection device for imaging a video image shown on a tilting mirror matrix is described only by way of example. As was already made clear in the preceding, optimizing can be carried out in different ways by adjusting different distances, using different polygonal bodies, lamps or optics depending on the given requirements.

While the foregoing description and drawings represent the present invention, it will be obvious to those skilled in the art that various changes may be made therein without departing from the true spirit and scope of the present invention.

What is claimed is:

1. A projection device comprising:
   a matrix located in an image plane for generating a video image;
   optics for projection of said video image on a screen;
   a light source for illuminating the matrix; and
   an arrangement by which the video image can be uniformly illuminated, said arrangement comprises a device for mixing the light of the light source by multiple reflections being provided between the light source and the matrix, and wherein mixed light is directed onto the matrix proceeding from the device, wherein a cylindrical adjusting element is provided behind the device for mixing, said adjusting element including a deflecting mirror and an optical system for focusing the mixed light on the matrix and said adjusting element allowing both a rotation and a displacement toward and away from the matrix.

2. The projection device according to claim 1, wherein a device for mixing the light of the light source by multiple reflections is provided between the light source and the matrix, and wherein the mixed light is directed onto the matrix proceeding from the device.

3. The projection device according to claim 2, wherein the matrix is a matrix formed of digitally controllable tilting mirrors.

4. The projection device according to claim 2, wherein coupling-in optics are provided between the light source and the device for mixing.

5. The projection device according to claim 2, wherein coupling-out optics are provided between the device for mixing and the matrix, wherein the matrix can be illuminated by the coupling-out optics.

6. The projection device according to claim 2, wherein a field lens is provided in front of the matrix.

7. The projection device according to claim 2, wherein the device for mixing has a body in the form of a geometric prism, wherein the light from the light source is introduced into a base surface of the prism and the mixed light for illuminating the matrix is taken from an upper surface of the prism.

8. The projection device according to claim 7, wherein the geometric prism has a rectangular base surface, wherein the ratio of the sides of the base surface is determined by the aspect ratio of the video image formed by the matrix.

9. The projection device according to claim 7, wherein an outer surface of the body is not provided with a reflective coating and the multiple reflections based on total reflection are carried out at this outer surface.

10. The projection device according to claim 9, wherein the ratio of the length of the prism axis to the lateral extension is greater than $$5/\sqrt{n^2-1}$$

where n represents the refraction coefficient of the material.

11. The projection device according to claim 9, wherein the body is held by a punctiform or linear support in the projection device.

12. The projection device according to claim 11, wherein a holder for the body is made from sheet metal with a thickness of less than 1 mm, and wherein the holder contacts the body exclusively by an edge having said dimensioning.

13. The projection system according to claim 12, wherein the thickness of the sheet metal is less than 0.5 mm.

14. The projection device according to claim 9, wherein a holder for the body is made from springing sheet metal whose spring tension acts vertical to the prism axis and draws the body vertical to the prism axis against an edge of the housing as an abutment, and wherein a groove is provided in an outer surface of the body, wherein a spring which is attached to the housing engages in this groove.

15. The projection device according to claim 2, wherein a color wheel is provided for color video display and wherein said color wheel is arranged between the light source and the device for mixing.

16. The projection device according to claim 1, wherein the light source is arranged near the matrix and at an angle such that the light bundle is directed away from it, and wherein a folded optical light path is provided for transmitting a light bundle emitted by the light source to the matrix.

17. The projection device according to claim 16, wherein the folded optical light path is brought about by two deflecting mirrors, wherein a light guide extends therebetween as said device for mixing.

18. The projection device according to claim 16, wherein said cylindrical adjusting element is provided in the folded optical light path, wherein said deflecting mirror of the folded optical light path is fastened in the adjusting element and wherein the light of the light source can be directed onto the matrix by said deflecting mirror.

19. The projection device according to claim 18, wherein an optical system for focusing the light bundle on the matrix is arranged in the adjusting element.

20. The projection device according to claim 19, wherein a rectangular, light-emitting surface supplied by the light source is formed in front of the adjusting element and the optical system comprises at least a two-lens system by means of which the light-emitting surface can be imaged on the matrix.

21. The projection device according to claim 20, wherein the linear magnification or imaging scale of the at least two-lens system is between 1 and 5.

22. The projection device according to claim 16, wherein a final deflecting mirror is provided which directs the light bundle out of a plane of the optical light path lying in front of this deflecting mirror onto the matrix.

23. A projection device comprising:

a reflective matrix located in an image plane for generating a video image;

optics for projection of said video image on a screen;

a light source for illuminating the matrix;

and an arrangement by which the video image can be uniformly illuminated, a field lens arranged in front of the matrix and wherein a light bundle directed on the matrix along the optical light path is directed through a field lens to the matrix, while the light reflected by the matrix into the optics for projection enters the optics for projection without being influenced by the field lens, wherein the field lens has a semicircular cross section vertical to its optical axis, especially a half-circular cross section which is arranged between the incident light bundle and the matrix, and wherein an opening defined by the divergence from the circular shape lies between the matrix and the optics for projection so that light reflected by the matrix and entering said optics for projection can pass through said opening.

* * * * *